United States Patent
Ando et al.

(10) Patent No.: US 6,825,247 B2
(45) Date of Patent: Nov. 30, 2004

(54) WATER-BASED INK AND PREPARING METHOD THEREOF

(75) Inventors: Hiroaki Ando, Hino (JP); Hidetaka Ninomiya, Hino (JP); Shinzo Omi, Tokyo (JP)

(73) Assignee: Konica Corporation (JP)

( * ) Notice: Subject to any disclaimer, the term of this patent is extended or adjusted under 35 U.S.C. 154(b) by 161 days.

(21) Appl. No.: 10/061,790

(22) Filed: Feb. 1, 2002

(65) Prior Publication Data

US 2002/0156154 A1 Oct. 24, 2002

(30) Foreign Application Priority Data

Feb. 16, 2001 (JP) .......................................... 2001-039935

(51) Int. Cl.$^7$ .......................... C09D 11/10; C08L 61/00; C08L 37/00
(52) U.S. Cl. ..................... 523/160; 523/201; 524/548; 524/593
(58) Field of Search ................................. 523/160, 161, 523/200, 201, 205, 208; 524/548, 593, 542

(56) References Cited

U.S. PATENT DOCUMENTS

| 4,230,775 | A | * | 10/1980 | Derick et al. | ................ | 428/525 |
| 5,623,296 | A | * | 4/1997 | Fujino et al. | ................ | 347/103 |
| 6,379,443 | B1 | * | 4/2002 | Komatsu et al. | .......... | 106/31.58 |
| 2002/0128348 | A1 | * | 9/2002 | Palmer | ........................ | 523/160 |
| 2003/0158291 | A1 | * | 8/2003 | Nakamura et al. | .......... | 523/160 |

OTHER PUBLICATIONS

Lewis Sr., Richard J.; Hawley's Condensed Chemical Dictionary 13$^{th}$ Edition, John Wiley & Sons, Ney York, 1997 (p. 907).*

Alger, Mark; Polymer Science Dictionary 2$^{nd}$ Edition, Chapman & Hall, London 1989 (pp. 460–461).*

* cited by examiner

*Primary Examiner*—Callie Shosho
(74) *Attorney, Agent, or Firm*—Muserlian, Lucas and Mercanti

(57) ABSTRACT

A water-based ink comprising colored particles, which comprise a dye and a polymer having an acetal group.

3 Claims, No Drawings

WATER-BASED INK AND PREPARING METHOD THEREOF

FIELD OF THE INVENTION

The present invention relates to a water-based ink and preparing method thereof.

BACKGROUND OF THE INVENTION

In recent years, recording materials employed in printers, printing presses, markers, and writing means have been demanded to be free from organic solvents and to be comprised of water. Widely employed as water-based recording materials are ones which are mainly comprised of an aqueous water-soluble dye solution and of a dispersion of fine pigment particles.

Recording materials employing water-soluble dyes are prepared as described below and then employed. Added to an aqueous solution as a main component, comprising water-soluble dyes which are classified into acidic dyes, direct dyes, and food dyes, are moisture retention agents such as glycols and alkanolamines, surface active agents to control surface tension, alcohols, and resins utilized as binders. These recording materials, employing water-soluble dyes, are most commonly employed due to their high reliability for minimized clogging at writing tips or recording systems. However, such recording materials tend to result in bleeding on recording sheets, such as paper, due to the fact that the employed dyes are water-soluble. Further, since it is required to increase an apparent drying rate, said recording materials are prepared so as to rapidly penetrate into said recording paper sheet. As a result, inevitably, recording quality can be degraded due to ink bleeding. Further, naturally, water resistance is inferior due to use of water-soluble dyes. Still further, it is difficult to assume that water-soluble dyes, which are simply penetrated into a paper sheet, dried and held, are subjected to "dying". As a result, the resulting light-fastness is very inferior. In order to overcome said drawbacks, in recent years, several methods have been proposed such as described in Japanese Patent Publication Open to Public Inspection No. 2000-281947, in a two-liquid system using a cationic polymer, by utilizing an interaction between the cationic polymer and the dye, bleeding is minimized by enhancing dyeability so that the resulting fastness is enhanced. However, it is difficult to state that light-fastness is improved while maintaining the color reproduction obtained by water-soluble dyes.

As methods to overcome problems of recording materials comprised of water-soluble dyes as noted above, the addition of fine resinous particles in the form such as an emulsion or a latex has been investigated over a long period. Japanese Patent Publication Open to Public Inspection No. 55-18418 proposes an ink jet recording material in which a latex is added which is "one type of a colloid composition prepared by dispersing a component such as rubber and resins into water in the form of fine particles (having a particle diameter of about 0.01 to several $\mu$m) employing an emulsifier." Exemplified as preferably employed latexes are synthetic rubber based latexes such as a styrene-butadiene copolymer latex, an acrylonitrile-butadiene copolymer latex, a polychloroprene latex, a vinylpyridine-styrene-butadiene latex, a butyl rubber latex, a polybutadiene latex, a polyisoprene latex, a polysulfide rubber latex, and synthetic resin based latexes such as an acryl ester based latex, a styrene-butadiene resin latex, a vinyl acetate based latex, a vinyl chloride based latex, and a vinylidene chloride based latex.

In said proposal, the diameter of latex particles, which can be added, is limited to the range of 0.01 to several $\mu$m. However, particles, which have a diameter of less than 0.2 $\mu$m, result in insufficient minimization of ink bleeding on recording paper sheets, and is not capable of providing high quality recording. On the other hand, when the particle diameter exceeds 1.0 $\mu$m, nozzles are frequently clogged whereby it is difficult to use it from the aspect of reliability. Accordingly, the range of the particle diameter, which is practically usable, is considered to be in the range of about 0.2 to about 1.0 $\mu$m. When such fine resinous particles are added to ink, it is necessary to pay particular attention to sedimentation or floating of particles due to the difference in specific gravity between said particle and the medium. In the case of said water-based ink, it is difficult that the specific gravity of said medium is far apart from 1.0. In fine particles having a diameter of no more than 0.2 $\mu$m, since gravity effects are larger compared to the diffusion force of particles due to Brownian movement, in such a region, it is necessary that the difference between the specific gravity of particles and the specific gravity of the medium is commonly adjusted to no more than 0.1, and is preferably adjusted to no more than about 0.07.

The specific gravity of synthetic rubber based latexes, exemplified in said patent publication, is in the range of about 0.9 to about 1.0 and meets to some extent the conditions described above. However, since most of said synthetic rubber comprises unsaturated double bonds in its molecule, problems with light-fastness as well as weather resistance are exhibited. Further, when said unsaturated bonds are decreased by carrying out vulcanization, fixing particles onto a recording paper is hindered resulting in problems with appearance quality of the recording. Furthermore, since the glass transition temperature of said synthetic rubber based latexes is relatively low, they tend to form a film at room temperature. As a result, when they are dried at the tip of ink jet nozzles, nozzles tend to be clogged. When once clogged, it is very difficult to remove clogging because dried latexes are flexible and adhesive. The synthetic resin latexes exemplified in said patent publication exhibit a specific gravity of at least 1.1, and specifically, the specific gravity of synthetic resins, comprising a halogen element, approaches nearly 1.3 to 1.5. As a result, all particles with their diameter in said range, which exhibits minimized bleeding effects, are prone to sedimentation.

Further, it is generally understood that most emulsifiers, which are employed during production of said latexes, tend to enhance the formation of bubbles in the ink and excessively decrease the surface tension of said ink, whereby many problems occur. Japanese Patent Publication Open to Public Inspection No. 54-146109 proposes a recording material employing a water-soluble dye to which fine vinyl polymer particles, which are swelled employing a solvent, as well as dyed with an oil dye, are added. Examples of preferably employed fine polymers particles mainly include fine acrylic acid ester or methacrylic acid ester based copolymer particles. Further, said patent publication states that a glass transition temperature of no more than 30° C. is an appropriate condition. It is self-evident that a film is formed when fine particles with such a low glass transition temperature, which are further swelled with a solvent, is dried at room temperature. As a result, it is easily assumed that when said ink is employed, nozzles will be frequently clogged. Japanese Patent Publication Open to Public Inspection No. 3-56573 proposes an image recording ink comprising a dye or a pigment together with 40 percent by weight of ultra-fine organic particles which have been subjected to internally three-dimensional cross-linking. Said fine cross-linked particles, which are added to said ink, are not capable of being fixed on a recording paper. As a result, it is clear that the fastness of said recorded images is inferior.

In order to overcome drawbacks of recording materials employing water-soluble dyes, it is proposed to employ carbon black or organic pigments in said recording materials. The water resistance of recording materials, which are comprised of such a pigment dispersion, is markedly improved. However, said pigments exhibit a relatively high specific gravity of 1.5 to 2.0. As a result, care is required to guard against the sedimentation of dispersed particles. In order to prepare a stable dispersion of said pigments having a relatively high specific gravity, it is required to achieve fine dispersion so that the average particle diameter reaches about 0.1 μm or less. As a result, the price of the resulting ink becomes very high due to higher cost for said dispersion. Further, a particle diameter of no more than 0.1 μm results in insufficiently reduced bleeding effects, whereby it is impossible to prepare recorded text and images with high appearance quality. Still further, problems occur in which physical properties of said ink, such as the surface tension, as well as foaming properties, are limited.

As an ink jet recording ink, proposals are made in which water-dispersible resins are dyed with oil-soluble dyes or hydrophobic dyes. These proposals are regarding "Ink which employs fine colored polymer particles as a recording material". For instance, Japanese Patent Publication Open to Public Inspection No. 54-58504 proposes an ink in which a mixture consisting of a hydrophobic dye solution and fine vinyl polymer particles is subjected to an oil-in-water dispersion. In the specification of said patent publication, it is disclosed that said fine vinyl polymer particles are swelled with a solvent in said dye solution upon being blended with said hydrophobic dye solution, and further colored with said dye. Said patent publication states that in order to utilize said hydrophobic dyes as the recording agent, the obtained images are water resistant. In said proposal, by employing water as a continuous phase and colored vinyl polymer particles swelled by the solvent as a dispersion phase, the viscosity of said ink can be allowed to be controlled by said water, as well allowing employment of solvents having a relatively high viscosity (having a low volatility).

Japanese Patent Publication Open to Public Inspection Nos. 55-139471 and 3-250069 propose inks in which emulsion polymerization or dispersion polymerization particles are employed which are dyed with a dye. The objective of said proposal is similar to Japanese Patent Publication Open to Public Inspection No. 54-58504, to minimize bleeding by dispersing colored particles into water (transparent) as a medium. In the case of said proposal, since no solvent is comprised, it is required that particles are fixed onto a recording paper upon being subjected to film forming. From the viewpoint of the requirement of said film forming as well as of achieving dispersion stability, it is suggested that the preferred particle diameter is in the range of submicrons. In Japanese Patent Publication Open to Public Inspection No. 54-58504, it is approved that dyeability is promoted by swelling polymer particles employing a solvent. In this case, however, problems occur in which nozzles are clogged due to film forming during drying at the tip of said nozzles.

Japanese Patent Publication Open to Public Inspection No. 4-185672 proposes minimizing particle sedimentation by achieving the difference in specific gravity to be no more than 0.04 between the colored resin particles and the aqueous medium by dissolving said water-soluble compound in an aqueous medium in an ink comprised of said colored resinous particles and said aqueous medium. Herein, preferably employed as water-soluble compounds are inorganic salts. However, when such inorganic salts are dissolved in said aqueous medium, ionic strength in the system increases, whereby the stability of the dispersion system decreases. As a result, fluid characteristics as the ink jet ink cannot be maintained due to coagulation of colored resinous particles. Japanese Patent Publication Open to Public Inspection Nos. 4-185673 and 4-185674 propose to achieve a difference in the specific gravity of no more than 0.04, between colored resinous particles and the aqueous medium, by decreasing the practical specific gravity of said colored resinous particles by swelling said color resinous particles with a solvent in an ink comprised of said colored resinous particles and the aqueous medium. In this case, as described above, it is difficult to achieve minimal nozzle clogging. In the foregoing, recording materials, which are mainly employed for ink jet recording, have been reviewed. However, the sedimentation of particles as well as clogging due to film forming during drying occurs when said water-based recording materials are employed in writing means, markers, marking pens, printers and printing presses utilizing other systems.

PROBLEMS TO BE SOLVED BY THE INVENTION

As described above, fine particle dispersion type recording materials, employing pigments and colored resinous particles, exhibit the possibility to overcome drawbacks of water-soluble dye type recording materials and exhibit the possibility to realize high recording appearance quality, but various problems remain unsolved. Particularly, when dyes, which result in excellent color reproduction, are employed, sufficient image fastness is not achieved. On the contrary, when pigments, which result in excellent image fastness, are employed, the resultant color reproduction is degraded. As a result, problems, which conflict with each other, have not yet been solved.

SUMMARY OF THE INVENTION

From the viewpoint of the foregoing, the present invention was achieved. It is an object of the present invention to provide a water-based ink which exhibits excellent color reproduction as well as excellent image fastness.

Said object of the present invention is accomplished employing the embodiments described below.

[Structure 1]
A water-based ink comprising colored particles, which comprise a dye and a polymer having an acetal group.

[Structure 2]
The water-based ink of Structure 1, wherein no less than 30% of oxygen atoms in the polymer form the acetal groups.

[Structure 3]
The water-based ink of Structure 1, wherein the polymer having an acetal group is polyvinyl butyral.

[Structure 4]
The water-based ink of Structure 1, wherein the colored particles are composed of a single phase.

[Structure 5]
The water-based ink of Structure 4, wherein the polymer having an acetal group in the colored particles accounts for no less than 50 weight-% of the total weight of polymer included in the colored particles.

[Structure 6]
The water-based ink of Structure 1, wherein the colored particles have a core-shell structure composed of a core-phase and a shell-phase.

[Structure 7]
The water-based ink of Structure 6, wherein the polymer having acetal group in the core-phase of the colored particles accounts for no less than 50 weight-% of the total weight of polymer included in the core-phase of the colored particles.

[Structure 8]
A method for preparing an water-based ink, wherein the method comprising a step of;
   dispersing colored particles, which comprise a dye and a polymer having acetal group, into an aqueous medium.

[Structure 9]

The method of Structure 8, wherein the polymer having an acetal group is polyvinyl butyral.

[Structure 10]
The method of Structure 8, wherein the polymer having an acetal group in the colored particles accounts for no less than 50 weight-% of the total weight of polymer included in the color particles.

[Structure 11]
The method of Structure 8, wherein the method further comprising a following step after the dispersing step; adding a polymerizable monomer and polymerization initiator so as to form a shell phase on each of the colored particle.

[Structure 12]
The method of Structure 11, wherein the polymer having an acetal group is polyvinyl butyral.

[Structure 13]
The method of Structure 11, wherein the polymer having an acetal group in the colored particles accounts for no less than 50 weight-% of the total weight of polymer included in the color particles.

The objects of the present invention can be also accomplished by the embodiment described below.

[Structure 2-1]
A preparing method of a water-based ink, wherein said ink is prepared by a method comprising steps of;
dissolving at least one polymer and at least one dye in organic solvent,
emulsify-dispersing the obtained organic solvent into an aqueous medium, and
removing the organic solvent.

[Structure 2-2]
The preparing method of Structure 2-1, wherein said polymer comprises a repeated structure selected from (A) through (D), described below:
wherein $R_1$ through $R_{11}$ each represent a hydrogen atom, an alkyl group, an alkenyl group, an aryl group, or an aralkyl group, which may have a substituent.

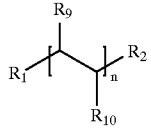
(A)

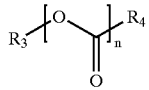
(B)

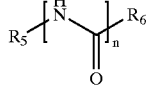
(C)

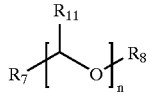
(D)

[Structure 2-3]
The preparing method of Structure 2-2, wherein a polymer having an acetal group, as a main functional group, accounts for at least 50 percent by weight of the total polymer.

[Structure 2-4]
The preparing method of Structure 2-2, wherein a polymer having a carbonic acid ester group, as a main functional group, accounts for at least 50 percent by weight of the total polymer.

[Structure 2-5]
The preparing method of Structure 2-2, wherein a polymer having a hydroxyl group, as a main functional group, accounts for at least 50 percent by weight of the total polymer.

[Structure 2-6]
The preparing method of Structure 2-2, wherein a polymer having an ester group, as a main functional group, account for at least 50 percent by weight of the total polymer.

[Structure 2-7]
The preparing method of Structure 2-2, wherein at least two polymers selected from a polymer having an acetal group, as a main functional group, a polymer having a carbonic acid ester, as a main functional group, a polymer having a hydroxyl group, as a main functional group, and a polymer having an ester group, as a main functional group, account for at least 50 percent by weight of the total polymer in the ink.

[Structure 2-8]
The preparing method of any one of Structures 2-1 through 2-7, wherein emulsify-dispersing step is carried out employing an ultrasonic homogenizer and the dispersion time is from 5 to 10,000 seconds.

[Structure 2-9]
The preparing method of any one of Structures 2-1 through 2-7, wherein emulsify-dispersing step is carried out employing a homogenizer utilizing high speed rotational shearing and the peripheral speed of the stirring blade is from 5 to 150 m/second.

[Structure 2-10]
The preparing method of any one of Structures 2-1 through 2-7, wherein emulsify-dispersing step is carried out employing a high pressure homogenizer and the applied pressure is from 100 to 5,000 kg/cm².

A water-based ink wherein said ink is produced employing the production method described in Structures 2-1 through 2-10.

The present invention will now be detailed.

The water-based ink in accordance with the present invention is comprised of a suspension of colored particles, which dyes are enclosed in a polymer having a specified functional group. Namely, dyes are enclosed in micelles formed by said polymer. Further, the water-based ink according to the present invention is comprised of said dye-enclosed micelles which exist in water as a suspension.

From the viewpoint of the permanence of ink after printing and suspension forming properties, the number average molecular weight of said polymer is preferably from 500 to 100,000, and is more preferably from 1,000 to 30,000. Various polymers having different glass transition points (Tg) may be employed. However, the Tg of at least one of employed polymers is preferably at least 10° C.

In the present invention, the polymers having a repeated structure selected from (A) through (D) described below are preferably used. Types and physical properties of the polymers are described in, for example, The Polymer Handbook, Fourth Edition (John Wiley & Sons, Inc.).

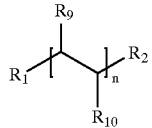
(A)

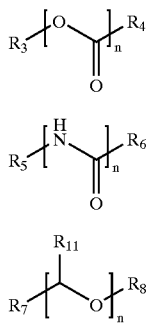

(B)

(C)

(D)

Listed as polymers having the repeated structure represented by (A) are polyethylene, polypropylene, polystyrene, polyvinyl chloride, polyvinyl acetate, polyacrylic acid ester, methacrylic acid ester, polyacrylonitrile, polyvinyl butyral, and polyvinyl alcohol.

Listed as polymers having the repeated structure represented by (B) are polyethylene terephthalate, alkyd resins, maleic acid resins, urethane rubber, and polycarbonates.

Listed as polymers having the repeated structure represented by (C) are nylon and polyurethane.

Listed as polymers having the repeated structure represented by (D) are polyethylene oxides, polypropylene oxides, polyformaldehyde, and epoxy resins.

These polymers may have substituents which may form a straight chain, a branched chain, or a ring.

Various types of these polymers, having said specified functional group, are commercially available, but may be synthesized employing conventional methods. Further, these copolymers may be prepared as follows. For example, an epoxy group is introduced into the molecule of one polymer, and subsequently, the resultant polymer undergoes condensation polymerization with other polymers or graft polymerization employing light or radioactive rays.

Preferred polymers are polymers having an acetal group, polymers having a carbonic acid ester group, polymers having a hydroxyl group, and polymers having an ester group, and polymers having an acetal group are particularly preferred.

Listed as polymers having an acetal group, as a main functional group, are polyvinyl butyral resins, which are commercially available under the trade name of #2000-L, #3000-1, #3000-2, #3000-4, #3000-K, #4000-1, #4000-2, #5000-A, #6000-C, and #6000-E, manufactured by Denki Kagaku Kogyo Co., Ltd., and BL-1, BL-1H, BL-2, BL-2H, BL-5, BL-10, BL-S, BL-SH, BX-10, BX-L, BM-1, BM-2, BM-5, BM-S, BM-SH, BH-3, BH-6, BH-S, BX-1, BX-3, BX-5, KS-10, KS-1, KS-3, and KS-5, manufactured by Sekisui Kagaku Kogyo Co., Ltd.

Polyvinyl butyral resins are prepared as derivatives of polyvinyl alcohol. The hydroxyl group of the original polyvinyl alcohol undergoes acetalation at 80 percent even at its maximum level and generally from 50 to 80 percent in term of the number of the hydroxyl groups. Incidentally, the acetal, as described herein, does not refer to a 1,1-diethoxyethane group in a narrow sense, but to general orthoaldehyde compounds. Said hydroxyl group is not particularly specified, and is preferably incorporated in an amount of 10 to 40 percent. Further, the content ratio of said acetyl group is also not particularly specified and is preferably no more than 10 mol percent. The polymers having an acetal group, as a main functional group, as described in the present invention, refer to ones in which at least 30 percent of oxygen atoms in said polymer form the acetal groups.

Employed as other polymers having an acetal group, as the main functional group, may be those of Upital Series manufactured by Mitsubishi Engineering Plastics Co., Ltd.

Listed as polymers having a carbonic acid ester, as the main functional group, are polycarbonate resins which include, for example Upiron Series and Novarex Series manufactured by Mitsubishi Engineering Plastics Co., Ltd. Said Upiron Series are manufactured employing Bisphenol A as a raw material. It is possible to employ those having various types of molecular weight, though said molecular weight varies depending upon measurement methods. In said Novarex Series, employed may be those having a molecular weight of 20,000 to 30,000 and a glass transition point of approximately 150° C., though those are not limited by said values.

Polymers having a carbonic acid ester group, as a main functional group, as described in the present invention, refer to ones in which at least 30 mol percent of oxygen atoms incorporated in said polymer contribute to form the carbonic acid esters.

Listed as polymers having a hydroxyl group, as the main functional group are, for example, polyvinyl alcohols. Many polyvinyl alcohols exhibit low solubility in organic solvents. However, polyvinyl alcohols having a small saponification value exhibit higher solubility in organic solvents. Polyvinyl alcohol, which is highly soluble in water, may be employed in such a manner that said polyvinyl alcohol is added to a water phase and after removing organic solvents, the resultant polyvinyl alcohol is adhered to a polymer suspension.

It is possible to use polyvinyl alcohols which are commercially available. For example, employed may be Kuraray Poval PVA-102, PVA-117, PVA-CSA, PVA-617, PVA-505, and in addition, polyvinyl alcohols for sizing agents under specific trade names, polyvinyl alcohols for heat fusion molding, and functional polymers such as KL-506, C-118, R-1130, M-205, MP-203, HL-12E, and SK-5102. Said saponification value is commonly 50 mol percent or more. However, polyvinyl alcohols such as LM-10HD, having a saponification value of about 40 mol percent may be employed. Besides such polyvinyl alcohols, polymers having a hydroxyl group as the functional group are preferably employed. Of these, it is possible to use a polymer in which at least 20 mol percent of oxygen atoms, incorporated in said polymer, form a hydroxyl group.

Listed as polymers having an ester group, as a main functional group, are, for example, methacrylic resins. It is possible to use one of the Delpet Series such as 560F, 60N, 80N, LP-1, SR8500, and SR6500, manufactured by Asahi Kasei Kogyo Co., Ltd. The polymer having an ester group, as the main functional group, as described herein, refers to one in which at least 30 mol percent of oxygen atoms, incorporated in said polymer, form an ester group.

Said polymers may be employed individually or in combination of two or more types. Further, when said polymers are incorporated in an amount of at least 50 percent by weight, other polymers as well as inorganic fillers may be incorporated.

Copolymers of said polymers are preferably employed. For example, a polymer having a hydroxyl group and other various polymers undergo copolymerization employing the following method. Said hydroxyl group is allowed to react with a monomer having an epoxy group such as glycidyl methacrylate. Subsequently, it is possible to prepare the desired compound by copolymerizing the resultant product with a methacrylic acid ester monomer, utilizing suspension polymerization.

Dyes, which are enclosed in said polymers, will now be described. Said dyes may be employed without any particular limitation as long as the dyes are capable of being enclosed in said polymers. Listed as examples may be oil dyes, dispersion dyes, direct dyes, acidic dyes, and basic dyes. From the viewpoint of excellent enclosing properties, oil dyes as well as dispersion dyes are most preferably employed. Specific example of said dispersion dyes are listed below, though they are not limited to these examples. Listed as the most preferred examples are C.I. Disperse Yellow 5, 42, 54, 64, 79, 82, 83, 93, 99, 100, 119, 122, 124, 126, 160, 184: 1, 186, 198, 199, 204, 224, and 237; C.I. Disperse Orange 13, 29, 31: 1, 33, 49, 54, 55, 66, 73, 118, 119 and 163; Disperse Red 54, 60, 72, 73, 86, 88, 91, 92, 92, 111, 126, 127, 134, 135, 143, 145, 152, 153, 154, 159, 164, 167: 1, 177, 181, 204, 206, 207, 221, 239, 240, 258, 277, 278, 283, 311, 323, 343, 348, 356, and 362; C.I. Disperse Violet 33; C.I. Disperse Blue 56, 60, 73, 87, 113, 128, 143, 148, 154, 158, 165, 165: 1, 165: 2, 176, 183, 185, 197, 198, 201, 214, 224, 225, 257, 266, 267, 287, 354, 358, 365 and 368; and C.I. Disperse Green 6: 1 and 9. Specific example of said oil dyes are listed below, though they are not limited to these examples. Listed as the most preferred examples are C.I. Solvent Black 3, 7, 27, 29, and 34; C.I. Solvent Yellow 14, 16, 19, 29, 56, and 82; C.I. Solvent Red 1, 3, 8, 18, 24, 27, 43, 51, 72, 73, 132, and 218; C.I. Solvent Violet 3; C.I. Solvent Blue 2, 11, and 70; C.I. Solvent Green 3 and 7; and C.I. Solvent Orange 2.

Alternatively, it is possible to employ such metal complex dyes as described in Japanese Patent Publication Open to Public Inspection Nos. 9-277693, 10-20559, and 10-30061. For example, it is possible to employ dyes represented by General Formulas (1) and (2) described in Japanese Patent Publication Open to Public Inspection No. 10-20559.

General Formula (1)

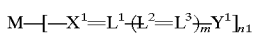

General Formula (2)

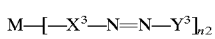

Specifically, the following dyes are listed.

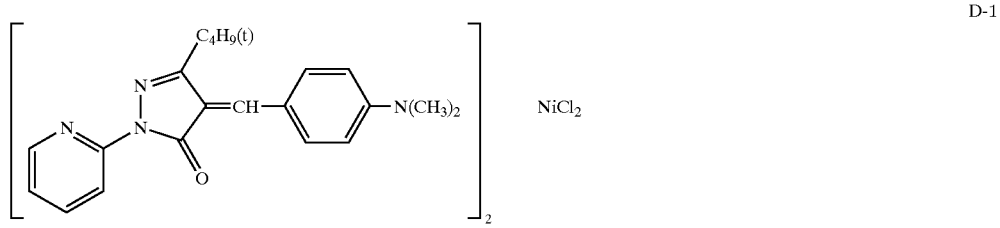

D-1

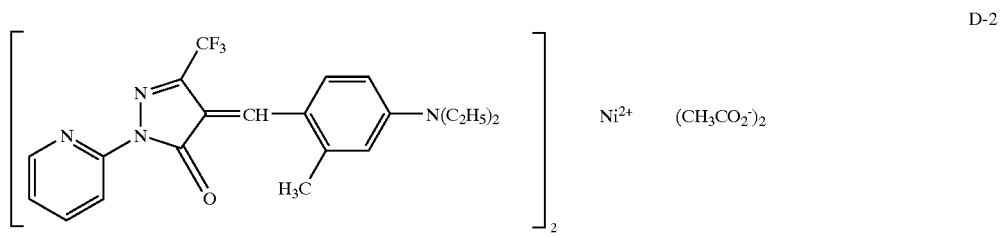

D-2

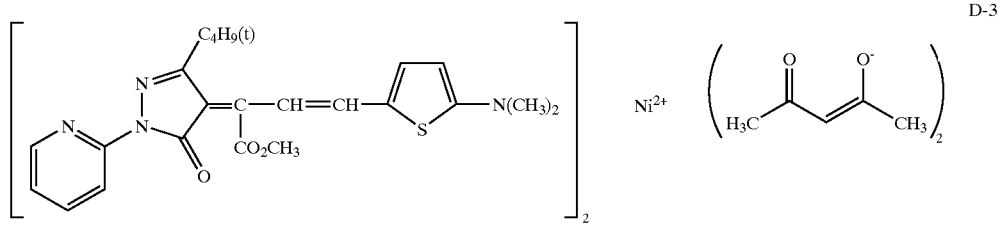

D-3

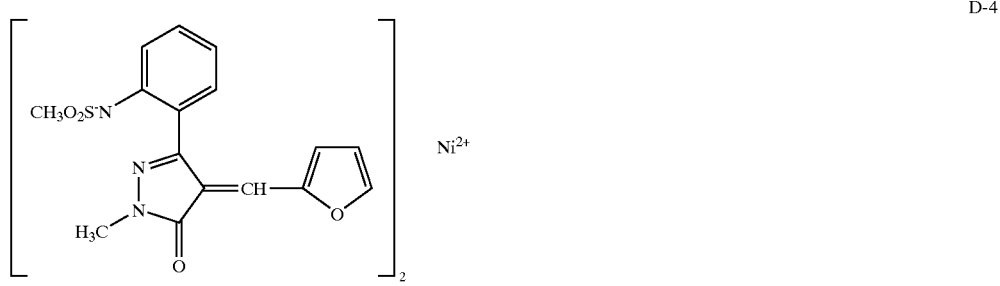

D-4

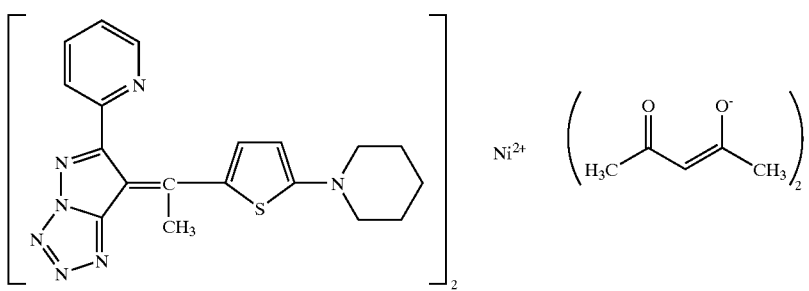
D-5
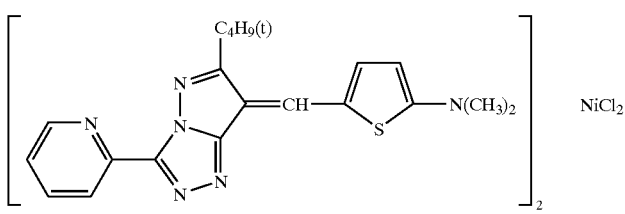
D-6
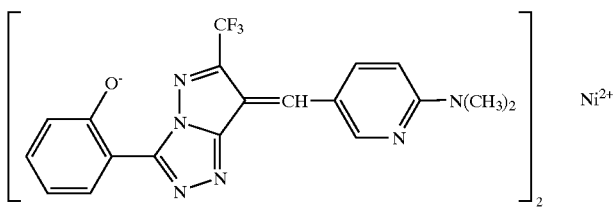
D-7
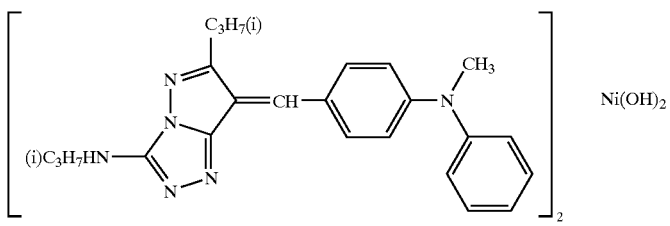
D-8
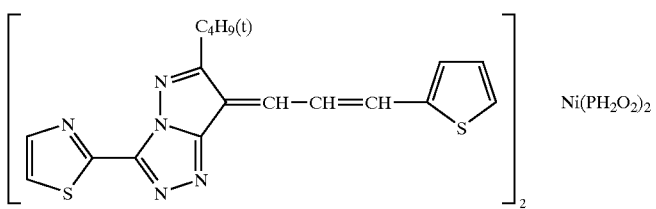
D-9
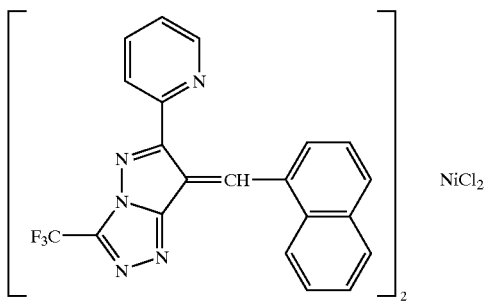
D-10

-continued
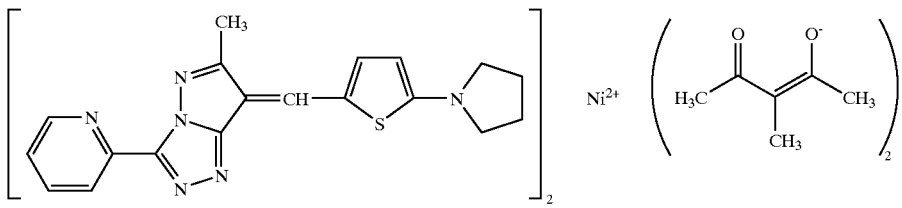
D-11
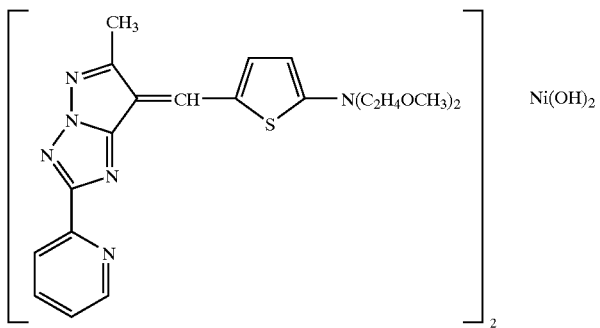
D-12
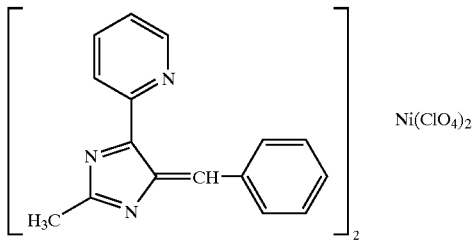
D-13
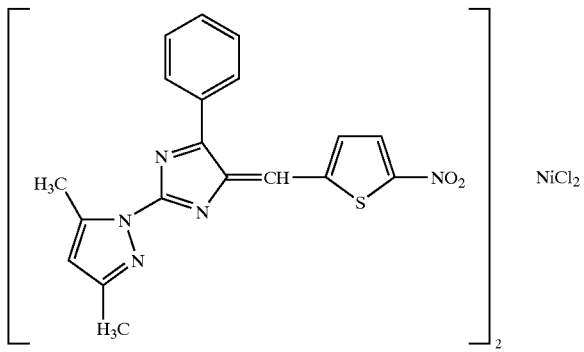
D-14
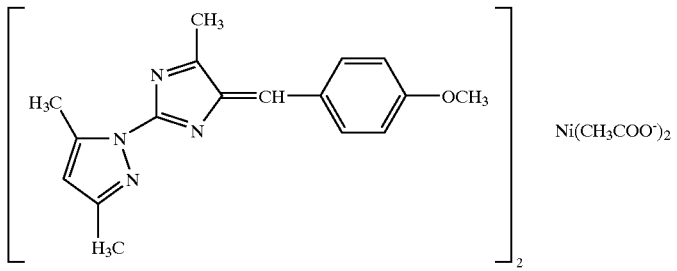
D-15
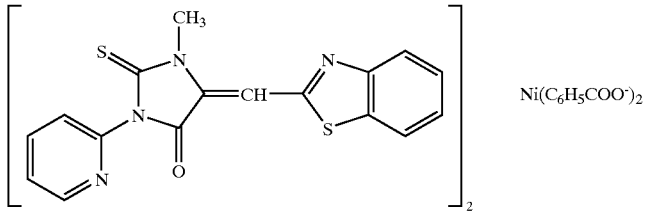
D-16

-continued
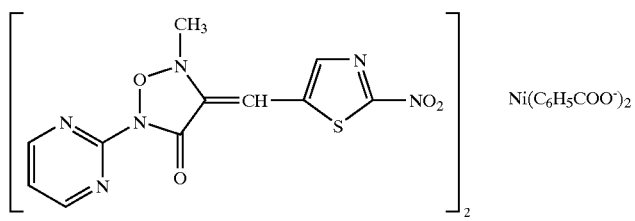
D-17
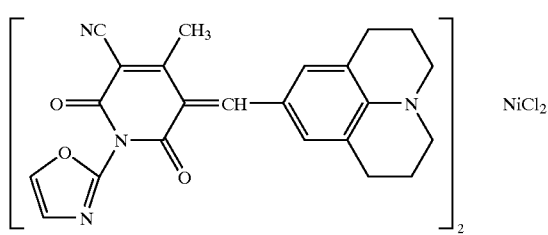
D-18
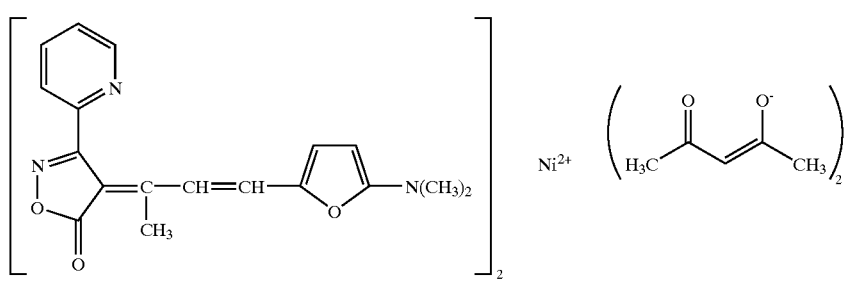
D-19
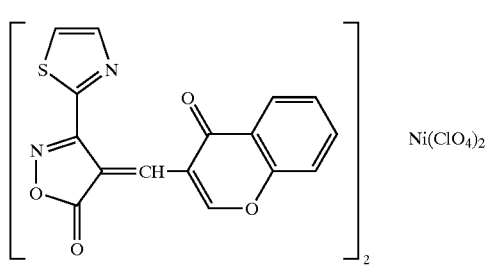
D-20
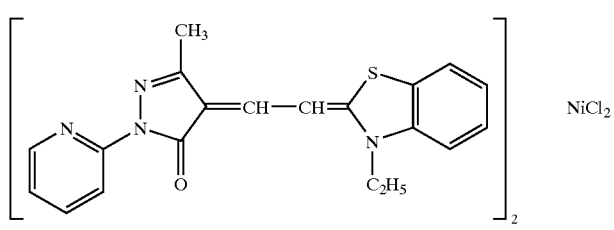
D-21
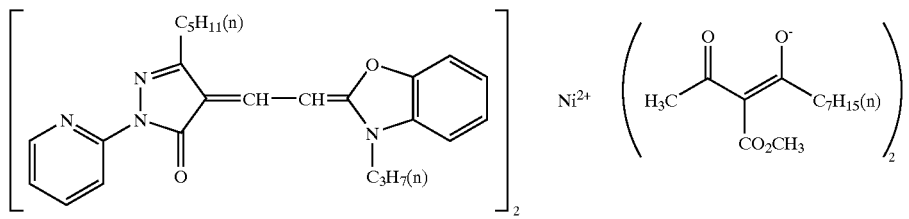
D-22

-continued
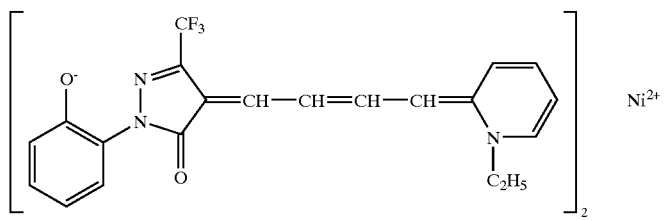 D-23
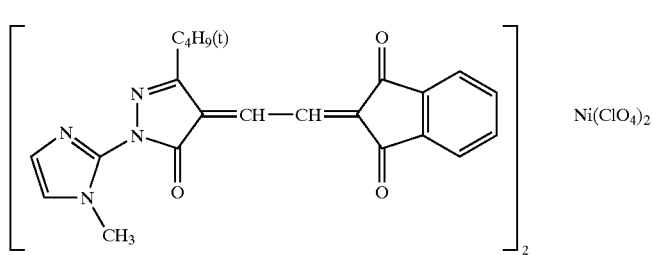 D-24
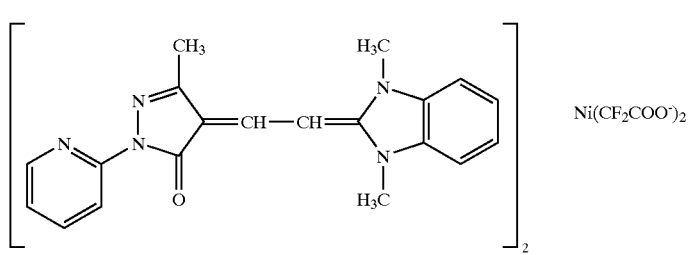 D-25
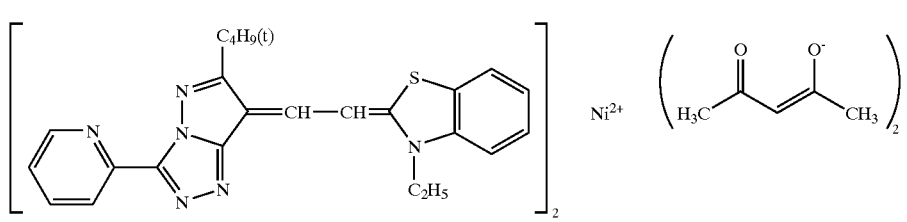 D-26
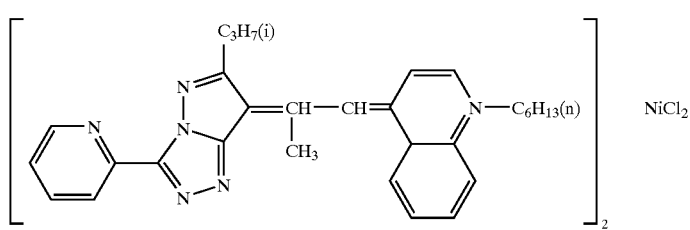 D-27
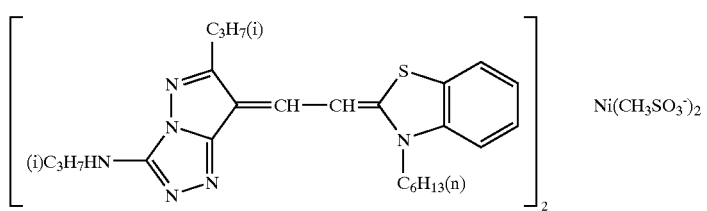 D-28

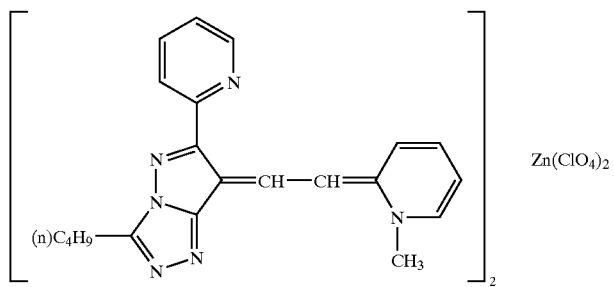
D-29
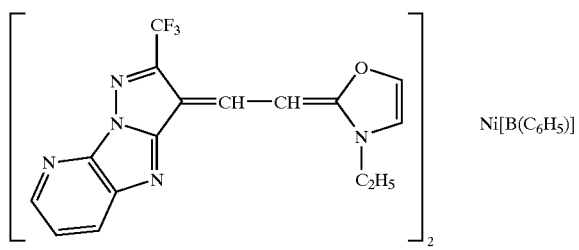
D-30
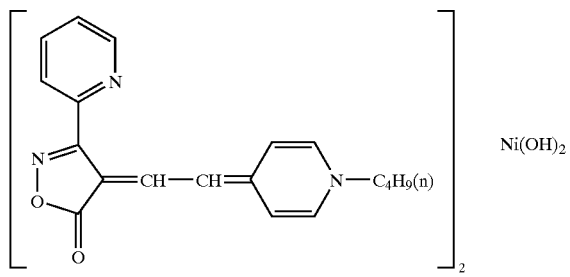
D-31
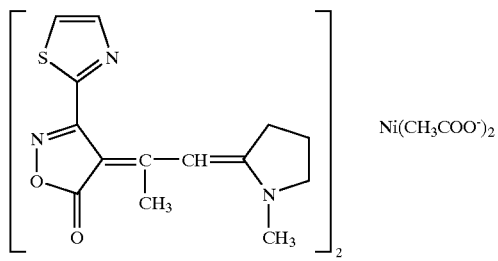
D-32
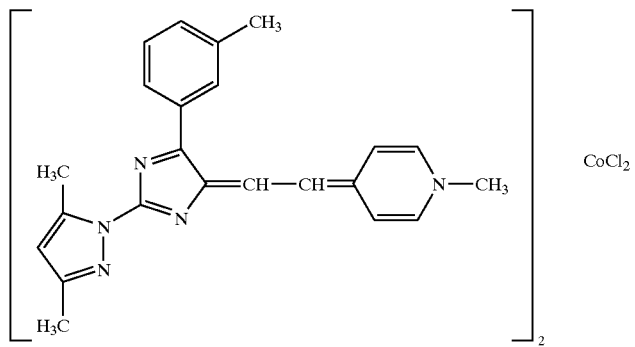
D-33

-continued
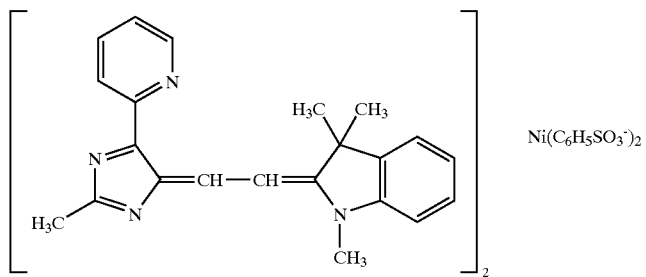 D-34
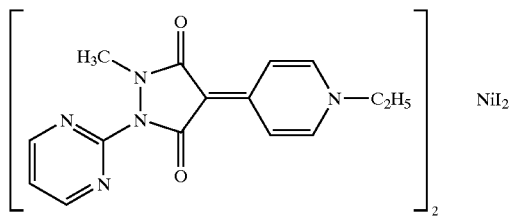 D-35
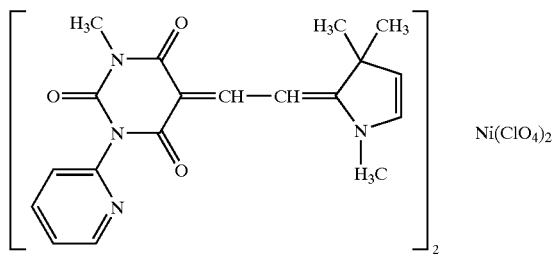 D-36
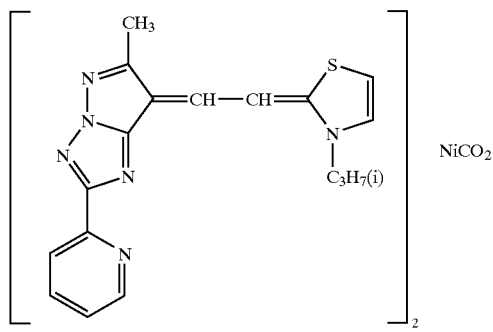 D-37
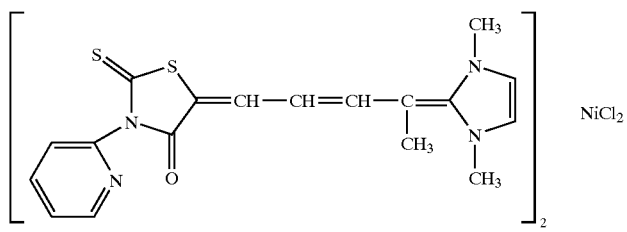 D-38
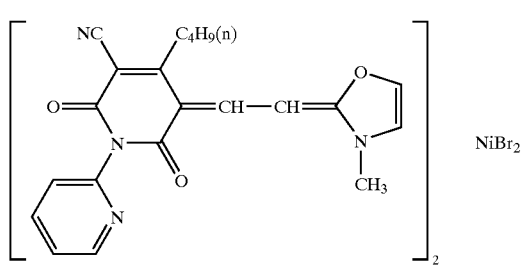 D-39

-continued
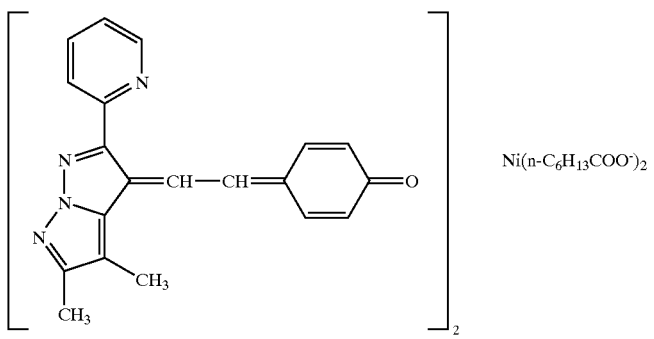 D-40
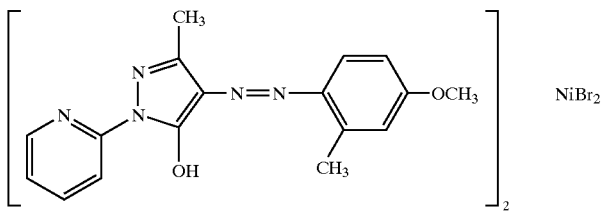 D-41
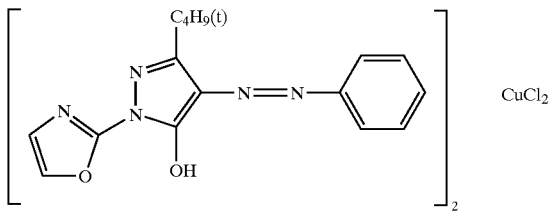 D-42
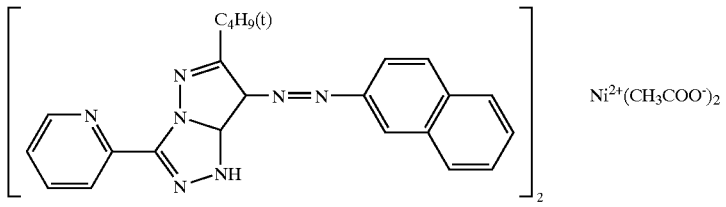 D-43
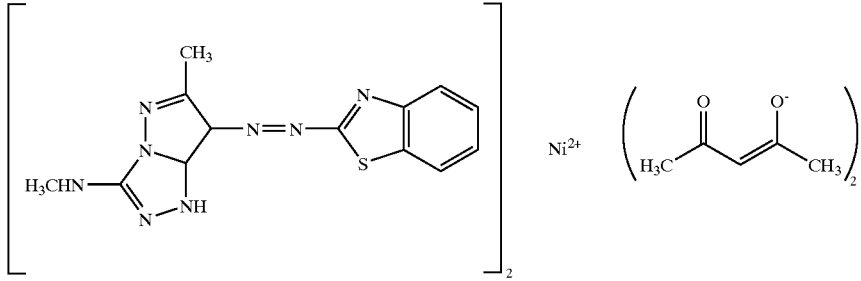 D-44
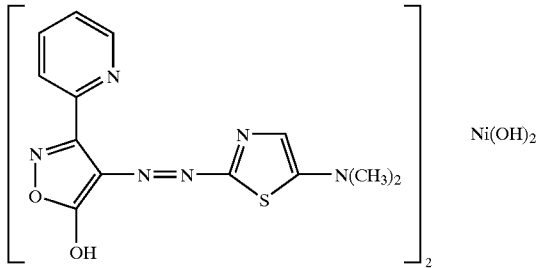 D-45

-continued
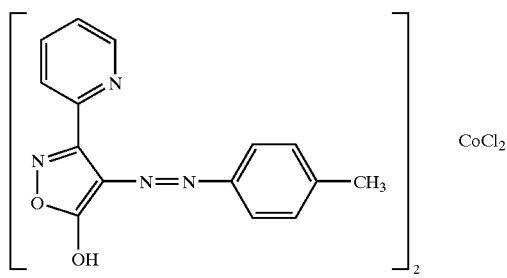 D-46
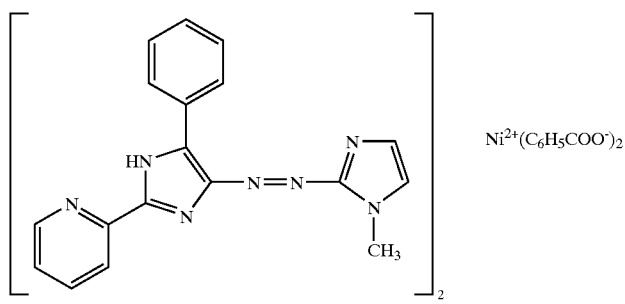 D-47
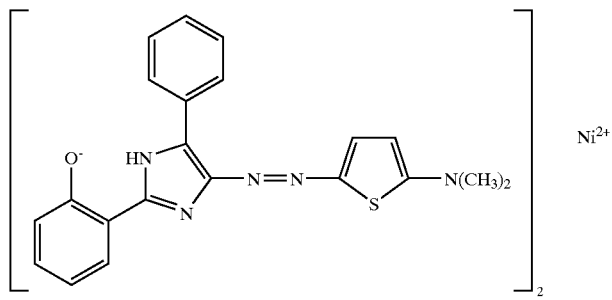 D-48
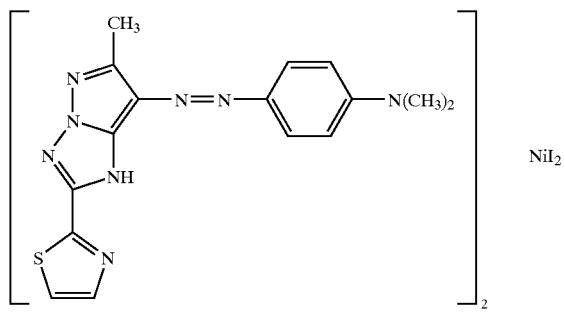 D-49
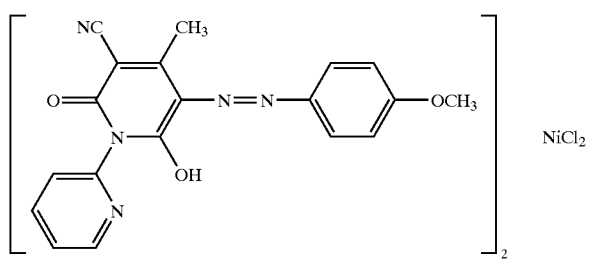 D-50

-continued
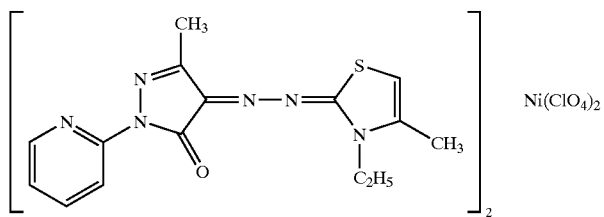 Ni(ClO₄)₂    D-51
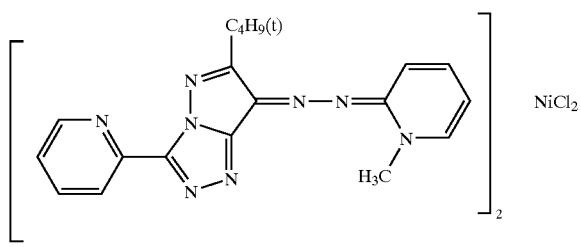 NiCl₂    D-52
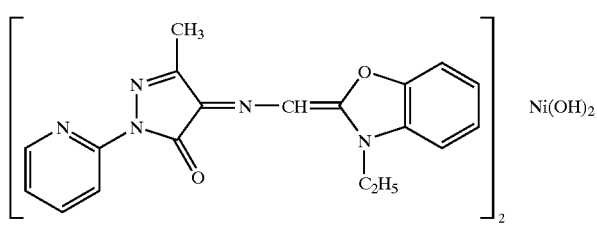 Ni(OH)₂    D-53
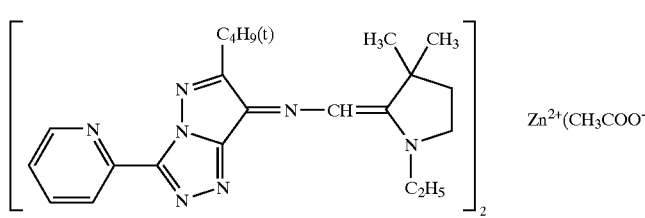 Zn²⁺(CH₃COO⁻)₂    D-54
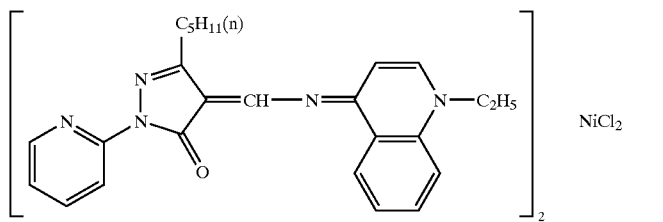 NiCl₂    D-55
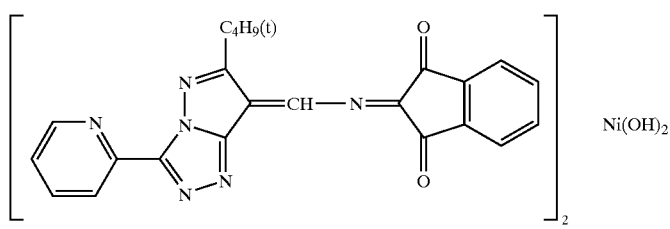 Ni(OH)₂    D-56
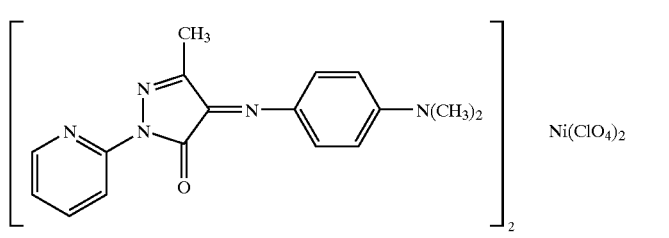 Ni(ClO₄)₂    D-57

-continued
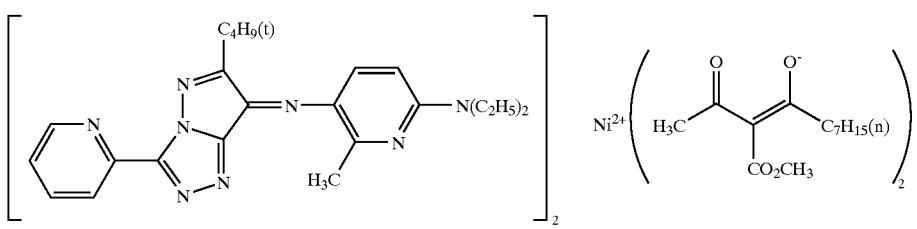
D-58
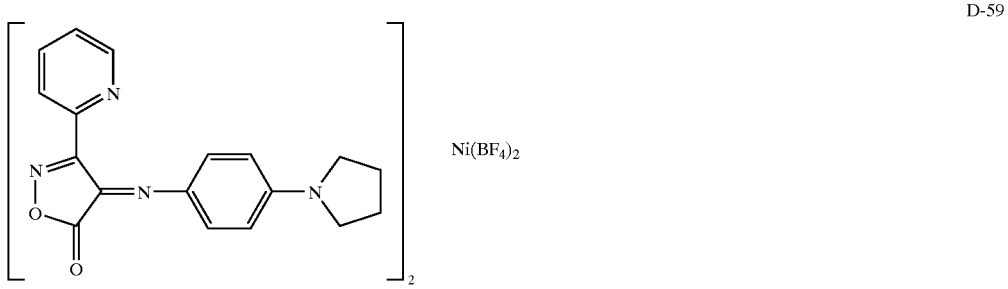
D-59
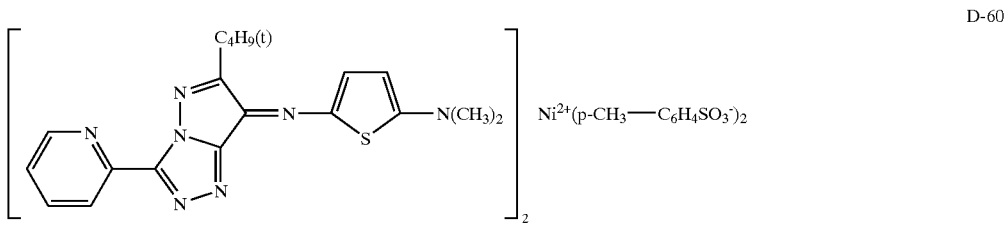
D-60
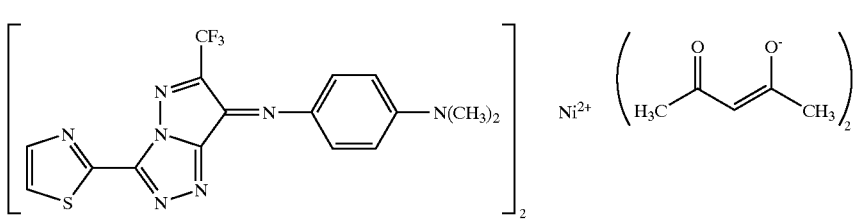
D-61
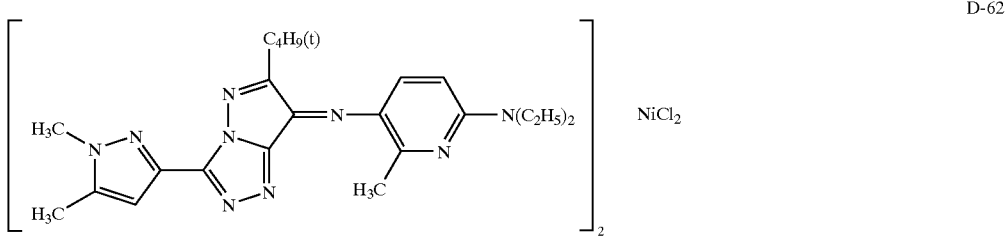
D-62
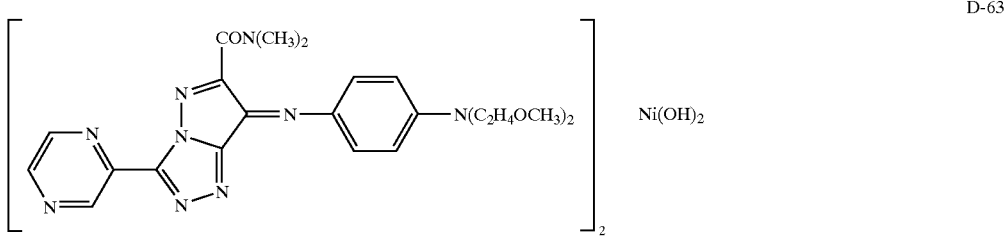
D-63

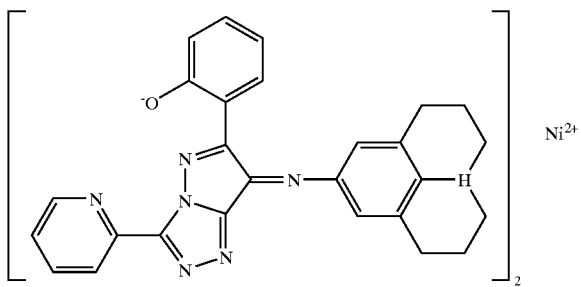
D-64
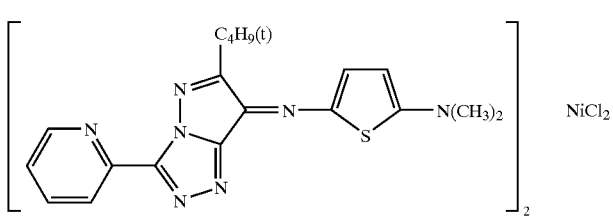
D-65
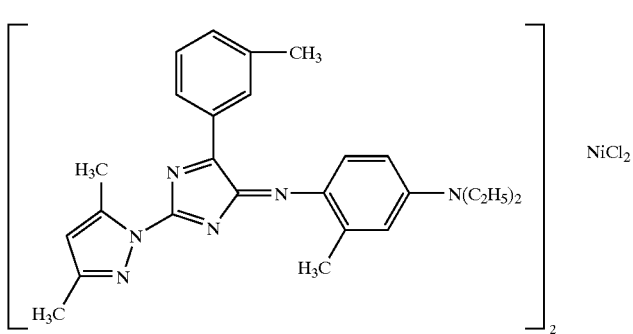
D-66
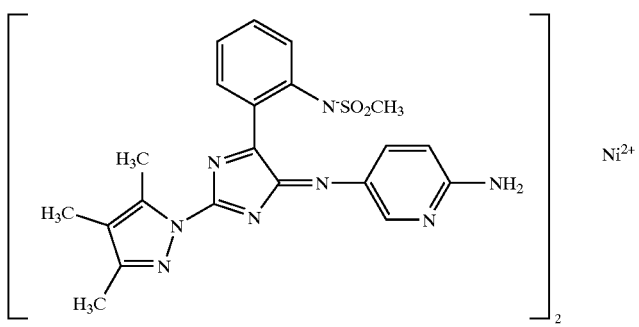
D-67
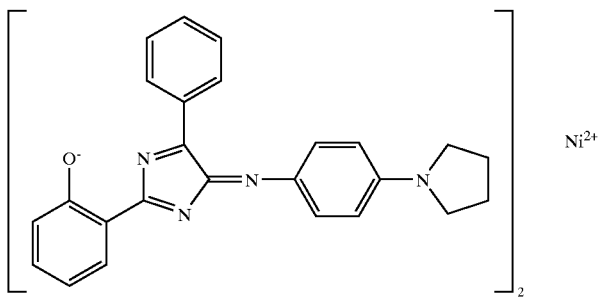
D-68

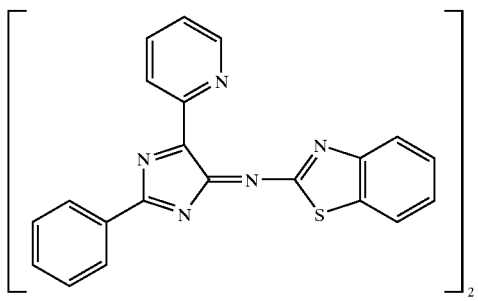

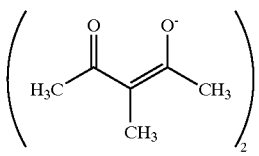

D-69

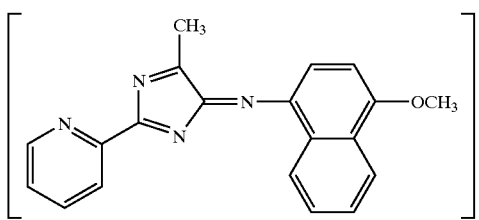

D-70

From the viewpoint that the dyes employed in the present inventing are efficiently enclosed in said polymer through the phase inversion emulsification, described below, said dye is preferably dissolved in an ester based or ketone based solvent in an amount of at least 10 g/L, and is more preferably in said solvent in an amount of 100 to 600 g/L.

The diameter of polymer particles (it is also referred to as colored particles), in which said dye is enclosed, is preferably no more than 0.5 μm. When said diameter exceeds 0.5 μm, the stability of the suspension comprising said particles may be degraded. Therefore, it is preferable that the diameter of said particles is adjusted to be in said range. The diameter of said particles is more preferably from 0.04 to 0.3 μm.

In the water-based ink according to the present invention, the blending ratio of said polymer in said ink is preferably from 0.5 to 50 percent by weight, and is more preferably from 0.5 to 30 percent by weight. When the blending ratio of said polymer is less than 0.5 percent by weight, it becomes difficult to obtain the desired printing density. On the other hand, when said blending ratio exceeds 50 percent by weight, the storage stability of the suspension used as ink is degraded. Further, a printer head occasionally clogs due to an increase in ink viscosity accompanied with ink evaporation at the tip of nozzles, as well as due to the coagulation of the suspension. Therefore, the blending ratio is preferably adjusted to the above-described range.

On the other hand, the blending ratio of said dye in said ink is preferably from 1 to 30 percent by weight, and is more preferably from 1.5 to 25 percent by weight. When the blending ratio of said polymer is less than 1 percent by weight, it becomes difficult to obtain the desired printing density, while when said blending ratio exceeds 30 percent by weight, the stability of the particle diameter in the suspension is degraded during storage whereby said particle diameter tends to increase. Therefore, the blending ratio is preferably adjusted to the above-described range.

The water-based ink according to the present invention is comprised of the suspension of polymer particles in which said dye is enclosed, while employing a water-based medium. Further, incorporated into said suspension may be various kinds of additives, conventionally known in the art, for example, humectants such as polyhydric alcohols, dispersing agents, silicone based antifoaming agents, chloromethylphenol based mildewcides and/or chelating agents such as EDTA, and oxygen absorbing agents such as sulfites.

Employed as humectants may be, for example, polyhydric alcohols, and ethers and acetates thereof such as ethylene glycol, propylene glycol, diethylene glycol, triethylene glycol, tetraethylene glycol, polyethylene glycol, glycerin, diethylene glycol diethyl ether, diethylene glycol mono-n-butyl ether, ethylene glycol monomethyl ether, ethylene glycol monoethyl ether, ethylene glycol monobutyl ether, methyl carbitol, ethyl carbitol, butyl carbitol, ethyl carbitol acetate, diethyl carbitol, triethylene glycol monomethyl ether, triethylene glycol monoethyl ether, and propylene glycol monomethyl ether; nitrogen containing compounds such as N-methyl-2-pyrrolidone, 1,3-dimethylimidazolidinone, triethanolamine, formaldehyde, and dimethylformamide; and dimethyl sulfoxide. These may be employed individually or in combination of two or more kinds. The blending ratio of said humectants is not particularly limited, however, the blending ratio of said humectants in said ink may preferably be from 0.1 to 50 percent by weight, and may more preferably be from 0.1 to 30 percent by weight.

Said dispersing agents are also not particularly limited. However, their HLB value is preferably from 8 to 18, because the desired effects as dispersing agents are exhibited and an increase in the particle diameter in the suspension is retarded. Employed as said dispersing agents may be commercially available products. Listed as such products are, for example, dispersing agents Demol SNB, MS, N, SSL, ST, and P (under the specific trade names) manufactured by Kao Corp.

The blending amount of said dispersing agents is not particularly limited. However, the blending ratio of said dispersing agents in the water-based ink of the present invention is preferably from 0.01 to 10 percent by weight. When said blending ratio of said compounds is less than 0.01 percent by weight, it becomes difficult to decrease the diameter of particles in the suspension, while when said blending ratio exceeds 10 percent by weight, the diameter of particles in the suspension increases whereby the suspension may result in a gel due to a decrease in the stability of the suspension. Therefore, said blending ratio is preferably adjusted to the above-described range.

Said antifoaming agents are also not particularly limited, and commercially available products may be employed. Listed as commercially available products are, for example, KF 96, 66, and 69; KS 68, 604, 607A, 602, and 603; and KM 73, 73A, 73E, 72, 72A, 72C, 72F, 82F, 70, 71, 75, 80, 83A, 85, 89, 90, 68-1F, and 68-2F (under the specific trade names), manufactured by Shin-Etsu Silicone Co. The blending amount of said compounds is not particularly limited. However, the blending ratio of said compounds in the water-based ink according to the present invention is preferably from 0.001 to 2 percent by weight. When the blending ratio of said compounds is less than 0.001 percent by weight, bubbles tend to form during preparation of said ink, and small bubbles formed in said ink are not easily removed. On the other hand, when said blending ratio exceeds 2 percent by weight, the formation of bubbles is minimized, but printing quality is occasionally degraded due to repellency of said ink during printing. Therefore, said blending ratio is preferably adjusted to said range.

The preparing methods of the colored particles and water-based ink comprising said particle according to the present invention will now be described.

In the present invention, with regard to colored particles, the following cases are considered, that in case (1) in which said colored particles are comprised of single composition and have no shell (may be called a case with only a core) and case (2) in which a core/shell structure is formed in which said core is covered with a shell comprised of another composition. However, from the viewpoint of the performance of a water-based ink, especially an ink for ink jet, said colored particles are preferably comprised of said core/shell structure.

Said shell in the present invention is prepared employing two methods: one in which a core, comprising dyes and polymers, is initially prepared and thereafter, a polymer shell is provided, and the other in which said core/shell is simultaneously formed employing a single step.

In either said case (1) or case (2), colored particles of the present invention preferably comprise at least one dye, and polymers comprising at least polymers having an acetal group. When said colored particles are comprised of said core/shell structure, said polymers comprising at least one polymer having an acetal group are preferably incorporated in said core.

Further, when the colored particles of the present invention do not comprise said shell, said polymers having an acetal group account at least 50 percent by weight of the whole polymers, preferably.

Still further, when the colored particles of the present invention are comprised of said core/shell structure, said polymers having an acetal group in said core account for at least 50 percent by weight of the whole polymers in said core.

(Cases in which the Shell is Provided After Forming the Core)

It is possible to prepare the core employing various methods, which include a method in which, for example, after dissolving oil-soluble dyes in a monomer and emulsifying the resulting mixture in water, said dyes are enclosed in a polymer prepared by polymerization; a method in which polymers and dyes are dissolved in an organic solvent, the resulting mixture is emulsified in water, and thereafter, said organic solvent is removed; and a method in which fine porous polymer particles are added to a dye solution, and said dyes are absorbed onto and impregnated into said fine particles. Methods, in which said polymer shell is provided onto said core, include a method in which a water-soluble polymer dispersing agent is added to the water based suspension of said core, which is then adsorbed; a method (seed polymerization) in which a monomer is gradually dripped and is deposited on the core surface during polymerization; and a method in which polymers dissolved in organic solvents are gradually dripped and adsorbed on the core surface during deposition.

(Methods to Form the Core/Shell at the Same Time During the Formation of the Colored Particles)

Said methods include a method in which polymers, which are employed to form a core, and dyes are dissolved in or dispersed into polymers which are employed to form a shell, and the resulting mixture is polymerized after being subjected to suspension in water; and a method in which the resulting composition is subjected to emulsion polymerization while being gradually dripped. Further, there is a method in which coloring materials are dissolved in or dispersed into a mixture consisting of a monomer capable of forming a core as well as a monomer capable of forming a shell after polymerization, and the resulting mixture undergoes suspension polymerization or emulsion polymerization.

In the present invention, dyes may be distributed into either the core or the shell. From the viewpoint of securing dye protection capability by polymers as well as dispersion stability in a medium, it is preferable that said dyes are mainly distributed into the shell.

In the present invention, the content ratio of the polymers, employed to form the shell, is from 5 to 95 percent by weight of the total polymer, preferably. When the ratio is no more than 5 percent by weight, the thickness of the shell becomes insufficient, whereby some part of the core, comprising coloring materials in a large amount, tends to appear on the surface of the particle. On the other hand, from the viewpoint of securing dispersion stability, an excessive amount of the polymers in the shell is not preferred due to an increase in the probability that said dyes will be present in the shell. The content ratio of the polymers, employed to form the shell, is more preferably from 20 to 80 percent by weight.

(Evaluation of the Core/Shell State)

In the present invention, the diameter of each particle is very small. As a result, from the viewpoint of resolving power, available analytical methods are limited. Employed as analytical methods to achieve said purposes may be TEM and TOF-SIMS. Core/shell structured colored particles may be observed employing a sample which is prepared by applying a dispersion onto a carbon support membrane and subsequently drying the coating. Since images, observed by said TEM, are generally monochromatic, it is required to colored particles for the evaluation of whether the core/shell has been formed. Only core structured colored particles are observed employing said TEM, and are compared with those which have been provided with the shell. Further, colored particles which are provided with the shell, and are not provided with the shell, are blended and dyed. Subsequently, it is confirmed that the ratio of colored particles which have been dyed in varying degrees is equal to the presence or absence of the shell. When said TOF-SIMS is employed, it is confirmed that by providing a shell on the surface of particles, the content of coloring materials adjacent to said surface decreases compared to one comprised of only the core. When the coloring material is comprised of elements which are not incorporated in the polymer of the core/shell, it is possible to confirm that by utilizing said elements as a prove, the shell, comprising said coloring material in a lesser amount, is provided. When said elements are not available, by employing suitable coloring materials, it is possible to compare the content of said coloring material in the shell with that provided with no shell. It is possible to clearly observe the formation of the core/shell, employing a sample which is prepared in such a manner that core/shell particles are buried in an epoxy resin, and an ultra-thin slice sample is prepared utilizing a microtome, followed by dying the resultant sample. When polymers or coloring materials comprise available elements as a prove, it is possible to estimate core/shell compositions as well as the distribution of the coloring material in the core and the shell.

It is possible to produce said water-based ink according to the present invention, utilizing various types of emulsification methods.

Employed as said emulsification methods may be various types of methods. Those examples are summarized on, for example, page 86 of "Kinosei Nyukazai•Nyukagijutsu no Shinpo to Oyotenkai C M C (Progress and Application of Functional Emulsifiers and Emulsification Technology, CMC)". In the present invention, emulsification dispersion devices, utilizing ultrasonic waves, high speed rotational shearing, and high pressure, are most preferably employed.

In emulsification dispersions employing ultrasonic waves, employed may be two systems, namely a so-called batch system and a continuous system. Said batch system is suitable for a relatively small production run, while said continuous system is suitable for mass production. In said continuous system, it is possible to use, for example, a device such as UH-600SR (manufactured by SMT Co., Ltd.). In the case of said continuous system, it is possible to obtain the application time of ultrasonic waves, employing the formula of volume of dispersion chamber/flow rate× circulation frequency. When a plurality of ultrasonic wave applying devices is employed, said application time is obtained as the sum of each applying time. Practically required ultrasonic wave applying time is at least three seconds. However, if emulsification is completed within three seconds, said ultrasonic emulsification dispersion device is not required. On the contrary, if the required application time is at least 10,000 seconds, load to processes increases. As a result, it becomes necessary to shorten the emulsification dispersion time by practically reselecting emulsifiers or employing other means. Therefore, an application time of 10,000 seconds or longer is not practically employed. Said application time is more preferably from 10 to 2,000 seconds.

Employed as said emulsification dispersion devices utilizing high speed rotational shearing may be the disper mixers described on pages 255 to 256 of "Kinosei Nyukazai-Nyukagijutsu no Shinpo to Oyotenkai C M C (Progress and Application of Functional Emulsifiers and Emulsification Technology, CMC)", the homomixers on page 251 of said publication, and the ultra-mixers on page 256 of said publication. Any of these types may be selected depending on the liquid viscosity during emulsification dispersion, and then used. In these emulsification dispersion devices utilizing high speed rotational shearing, the rotational frequency of their blade is critical. The gap from a stator is commonly about 0.5 mm, which is not capable of being markedly narrowed. Therefore, shearing force depends mainly on the peripheral rate of the blade of said device. A peripheral rate of 5 to 150 m/second may be applied to the emulsification dispersion of the present invention. When the peripheral rate is less than the lower limit, in most cases, an increase in the emulsification time makes it impossible to decrease the particle diameter to the desired level. In order to achieve the peripheral speed of 150 m/second, it is required to markedly enhance the motor performance. As a result, the peripheral rate is more preferably from 20 to 100 m/second.

In emulsification dispersions utilizing high pressure, LAB2000 (manufactured by SMT Co.), and the like, may be employed. The emulsification dispersion capacity depends on the pressure applied to samples. Said pressure is preferably from 100 to 5,000 kg/cm$^2$. If desired, emulsification dispersion may be repeated several times so as to obtain the target particle diameter. When said pressure is excessively low, in many cases, the target particle diameter may not be achieved even though the emulsification dispersion is repeated. On the other hand, it is not practical to achieve a pressure of 5,000 kg/cm$^2$ because the device is then subjected to application of excessive loads. Therefore, said pressure is more preferably from 500 to 2,000 kg/cm$^2$.

These emulsification dispersion devices may be employed individually or, if desired, in combination. The individual use of a colloid mill or a flow jet mixer is not capable of achieving the objectives of the present invention. However, when combined with the device described in the present invention, it is possible to enhance the effects of the present invention in such a manner that the desired emulsification dispersion is achieved within a shorter period of time.

In addition, besides the use of the aforesaid devices, the ink of the present invention can be produced utilizing so-called phase inversion emulsification.

Said phase inversion emulsification, as described herein, is performed in such a manner that said polymer is dissolved in an organic solvent such as ester or ketone together with said dye; if desired, the carboxyl group in said polymer is ionized by adding a neutralizer; and subsequently, after adding an aqueous phase, the resultant phase is subjected to phase inversion to an aqueous system while distilling out said organic solvent.

After completing said phase inversion, said ester or ketone based solvent as well as specified amount of water is removed under a reduced pressure while heated. As a result, a water-based ink, having the desired concentration according to the present invention, is produced.

It is possible to employ the water-based ink according to the present invention as inks for common writing means such as fountain pens, ballpoint pens, and felt-tip pens, other than the ink jet recording ink.

EXAMPLES

The water-based ink of the present invention will now be detailed with reference to examples. However, the present invention is not limited to these examples.

Example 1

Placed in a separable flask were 15 g of polyvinyl butyral (BL-S having an average degree of polymerization of 350, manufactured by Sekisui Kagaku Co., Ltd.) as a polymer, 10 g of a chelate dye (Exemplified Compound D-5), and 150 g of ethyl acetate. After replacing all air in said flask with N$_2$, said polymer as well as said dye was completely dissolved while stirring. Subsequently, 150 g of an aqueous solution, comprising 6 g of sodium laurylsulfonate as a dispersing agent and 2 g of water-soluble polymer MP-203 (manufactured by Kuraray Co., Ltd) were added dropwise, while stirring. After stirring, the resultant mixture was emulsified for 300 seconds, employing an ultrasonic homogenizer (UH-150 Type, manufactured by SMT Co., Ltd.). Thereafter, ethyl acetate was removed under reduced pressure, whereby a polymer emulsion impregnated with said dye was prepared.

Example 2

A polymer emulsion was prepared in the same manner as Example 1, except that BL-S was replaced with a mixture consisting of 1 g of a polyvinyl alcohol resin (MP-20, manufactured by Kuraray Co., Ltd.) and 14 g of BL-S, and the dye was replaced with 10 g of Valifast Yellow 3150 (manufactured by Orient Kagaku Co., Ltd.).

Example 3

A polymer emulsion was prepared in the same manner as Example 1, except that BL-S was replaced with a mixture consisting of 1 g of PMMA resin (Delpet 560F, manufactured by Asahi Kasei Kogyo Co., Ltd.) and 14 g of BL-S, and the dye was replaced with 10 g of Oil Black BY (manufactured by Orient Kagaku Co., Ltd.).

Example 4

A polymer emulsion was prepared in the same manner as Example 1, except that the ultrasonic homogenizer (UH-150 Type) was replaced with a high speed stirring type emulsification dispersion device, TK Robomix AG-03 Type (manufactured by Tokushukika Kogyo Co.) and emulsification dispersion was carried out with a stirring section comprising a stator and a turbine, rotating at 15,000 rpm for 20 minutes.

Example 5

A polymer emulsion was prepared in the same manner as Example 1, except that the ultrasonic homogenizer (UH-150 Type) was replaced with a high pressure type emulsification dispersion device LAB 2000 (manufactured by SMT Co.) and 10-pass emulsification dispersion was carried out at 1,500 kg/cm$^2$.

Examples 6 through 10

While a solution comprising 7.5 g of styrene and 2.5 g of 2-hydroxyethyl methacrylate and 5 g of an aqueous potassium persulfate solution (10 percent by weight) were dripped, seed polymerization was carried out, whereby a core/shell structured polymer emulsion was prepared.

Examples 11 and 12

A polymer emulsion (Example 11) was prepared in the same manner as Example 3, except that the content ratio of BL-S (PVB or polyvinyl butyral) to all the polymers was varied to 50 percent by weight, while a polymer emulsion (Example 12) was prepared in the same manner as Example 3 except that said ratio was varied to 40 percent by weight.

Examples 13 and 14

A polymer emulsion (Example 13) was prepared in the same manner as Example 8, except that the content ratio of BL-S (PVB or polyvinyl butyral) of the core of colored particles to all the polymers was varied to 50 percent by weight, while a polymer emulsion (Example 14) was prepared in the same manner as Example 8 except that said ratio was varied to 40 percent by weight.

| | |
|---|---|
| Water-based dispersion of the polyester suspension prepared in Examples 1 through 14 | 80 g |
| Diethylene glycol | 10 g |
| Glycerin | 9.8 g |
| Acetylenol EL | 0.20 g |

The above components were blended and dispersed. The resulting dispersion was filtered through a 5-micron filter to remove dust and coarse grains, whereby an ink for ink jet printing was prepared. By employing the resultant ink, printing was carried out onto Konica Photo Jet Paper, Photolike QP Glossy Paper (manufactured by Konica Corp.) while employing a commercially available ink jet printer (Model PM-800) manufactured by Epson Co.

Comparative Example 1

An ink was prepared based on the following formulation, comprising the water-soluble dye which is commonly used in ink for ink jet recording.

| | |
|---|---|
| C.I. Acid Yellow | 4 g |
| Diethylene glycol | 7.5 g |
| Glycerin | 7.5 g |
| Water | 80.60 g |
| Acetylenol EL | 0.40 g |

The above components were blended for 12 hours employing a ball mill. The resultant dispersion was filtered employing a 5-micron filter so as to remove dust as well as coarse particles, whereby an ink was prepared. Employing the resultant ink, printing was carried out in the same manner as Example 1.

Comparative Example 2

Each of the dyes employed in Examples 1 through 6 was pre-dispersed employing a multiple stage stator system mixer (Multimizer, manufactured by Tokushukika Kogyo Co.), and subsequently was dispersed employing a mini-motor mill (M-100, manufactured by Iger Japan Co., Ltd.). Then, an ink was prepared employing each of the resultant dispersions under the same composition as Comparative Example 1, and an ink for ink jet printing was prepared in the same manner as Example 1. By employing the resultant ink for ink jet printing, printing was carried out in the same manner as Example 1. As a result, it was found to be impossible to carry out printing employing said ink.

The light-fastness as well as the color of the obtained printing samples was evaluated. Table 1 shows the results.

TABLE 1

| Example No. | Particle Diameter (in nm) (1) | Light-fastness (2) | Color tone (3) | Structure of The particles | Remarks |
|---|---|---|---|---|---|
| Example 1 | 80 | 45% | A | Only core | Inv. |
| Example 2 | 120 | 50% | A | Only core | Inv. |
| Example 3 | 100 | 55% | A | Only core | Inv. |
| Example 4 | 140 | 50% | A | Only core | Inv. |
| Example 5 | 100 | 45% | A | Only core | Inv. |
| Example 6 | 90 | 75% | A | Core-shell | Inv. |
| Example 7 | 110 | 85% | A | Core-shell | Inv. |
| Example 8 | 120 | 75% | A | Core-shell | Inv. |
| Example 9 | 130 | 70% | A | Core-shell | Inv. |
| Example 10 | 120 | 80% | A | Core-shell | Inv. |
| Example 11 | 120 | 50% | A | Only core | Inv. |
| Example 12 | 130 | 35% | A | Only core | Inv. |
| Example 13 | 160 | 53% | A | Core-shell | Inv. |
| Example 14 | 190 | 40% | A | Core-shell | Inv. |
| Comparative Example 1 | — | 5% | B | — | A |
| Comparative Example 2 | 580 | — | — | — | — |

Herein, the particle diameter refers to the number average particle diameter, which was determined employing a laser particle diameter analysis system manufactured by Otsuka Denshi Co., Ltd.

The light-fastness test was carried out employing a low temperature Xe weather meter XL75 (manufactured by Suga Shikenki Co.). Further, density variation was determined employing X-Rite 900 (manufactured by Nihon Heiban Kizai Co.). The evaluation criteria are as follows:
commercially viable level: retained density after the one week test was not less than 30 percent of the original density
commercially unviable level: retained density after the one week test was less than 30 percent of the original density.

Color was visually evaluated based on the following criteria:
A: commercially viable level
B: not commercially viable level.

EFFECTS OF THE INVENTION

As detailed above, it is possible to prepare a water-based ink which exhibits excellent color reproduction as well as excellent fastness, employing coloring materials which are prepared by emulsifying in a water-based solvent oil-soluble dyes dissolved in an organic solvent and a polymer emulsion prepared by impregnating said coloring material into fine polymer particles having the specified functional group.

What is claimed is:

1. A water-based ink comprising colored particles, which comprise a dye and a polymer having an acetal group, wherein the colored particles have a core-shell structure comprising a core-phase and a shell-phase.

2. The water-based ink of claim 1, wherein the polymer having an acetal group in the core-phase of the colored particles accounts for no less than 50 weight-% of the total weight of polymer included in the core-phase of the colored particles.

3. The water-based ink of claim 1 wherein the polymer having an acetal group is a polyvinyl butyral.

* * * * *